United States Patent Office 3,479,934
Patented Nov. 25, 1969

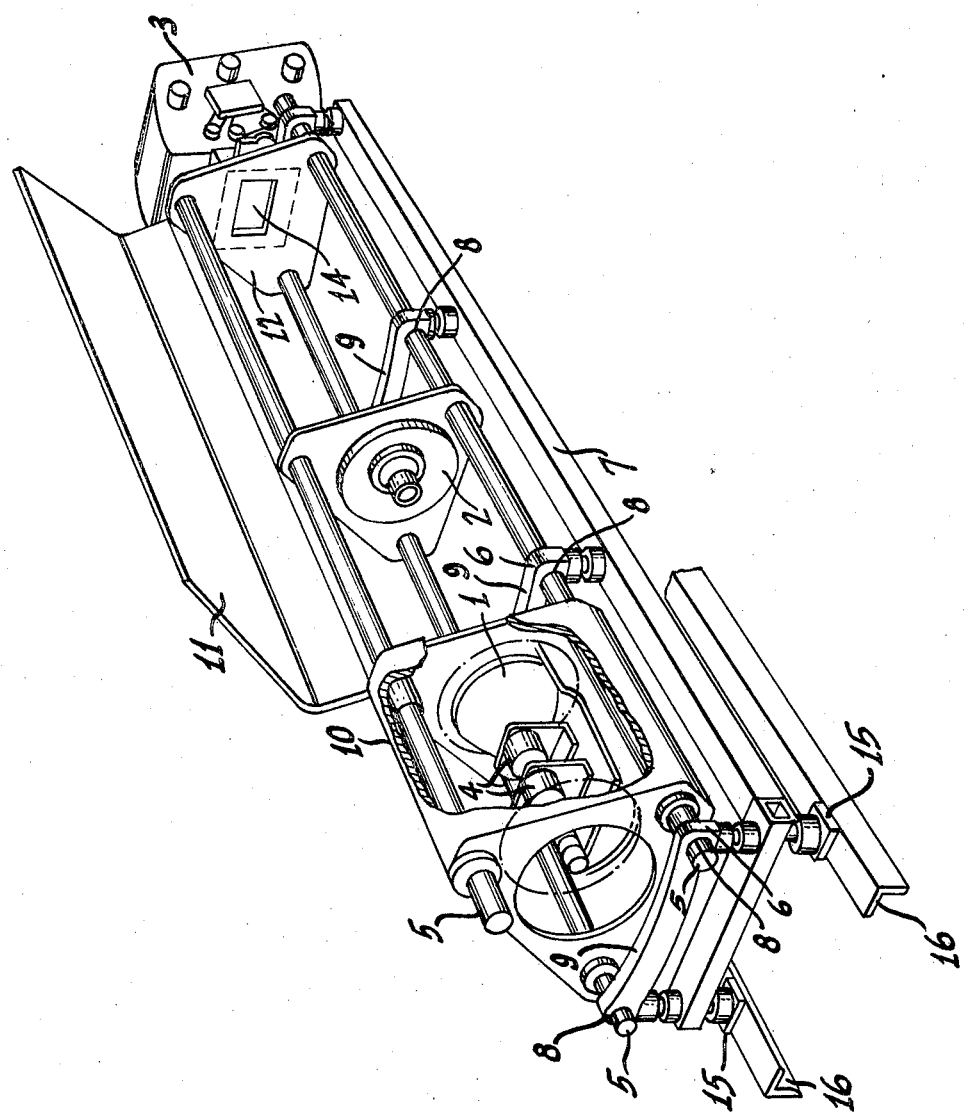
Inventors:
JAMES F. DELANY &
GERARD O. WALTER
John V. Regan
Attorney

3,479,934
PHOTOCOMPOSING APPARATUS SUPPORT STRUCTURE
James F. Delany, Cinnaminson, and Gerard O. Walter, Skillman, N.J., assignors to RCA Corporation, a corporation of Delaware
Filed Oct. 11, 1966, Ser. No. 585,910
Int. Cl. B41b 13/00, 15/00, 17/00
U.S. Cl. 95—4.5                    2 Claims

ABSTRACT OF THE DISCLOSURE

A support structure for a photocomposing machine for supporting a plurality of operative components therein includes a group of three substantially horizontal and substantially parallel support bars spaced from each other in a manner to form a triangular profile so as to define a delimited volume. The operative components of the photocomposing machine are slidably mounted on the support bars within the delimited volume and the slidable mountings include a plurality of support eyelets attached to the operative components for slidably receiving the support bars.

---

The operative requirements found in the field of high speed printing have led to the use of electro-optical devices for composing characters into an intermediate representation of the data desired to be printed in document form. One such prior art machine employs a cathode ray tube for displaying the characters in suitable arrangements and a camera system for producing a record of the tube display on a recording medium, e.g., photographic film. However, in order to produce a record having a character positioning accuracy suitable for use in the printing industry, i.e., character spacings measured in thousandths of an inch, as a master from which the photosensitive masters, or printing rollers, may be photoengraved, the recorded characters must be positioned in an extremely precise and repeatable fashion. Accordingly, the cathode ray tube and the camera system must be supported on a structure which isolates the recording apparatus from transient disturbances occasioned by fluctuations in environmental temperature, mechanical vibrations, etc.

Prior art support structures for optical devices have relied on massive central supports for holding the operative components of a photocomposing machine. Further, the prior art apparatus was located in a controlled and sealed environment which necessitated unreasonably expensive installation costs. Such prior art problems have partly been responsible for an absence of commercially available photocomposing machines using electronic principles which would provide the most rapid photocomposing operation. Thus, the combination of stringent requirements of the printing industry coupled with the mounting problems associated with electronic apparatus, such as the cathode ray tube, have been factors in preventing the successful introduction of electronic photocomposing machines.

An object of the present invention is to provide an improved photocomposing apparatus.

Another object of the present invention is to provide an improved structure for precisely positioning the operative components of a photocomposing apparatus.

A further object of the present invention is to provide an improved support structure for isolating a photocomposing apparatus from undesired environmental disturbances.

In accomplishing these and other objects, there has been provided, in accordance with the present invention, a support structure for a photocomposing machine having three support bars arranged in triangulated longitudinal fashion to provide the framework within which are positioned the operative components including a cathode ray tube device, a lens system and recording camera apparatus. These components are slidably supported by shock-absorbing mounts arranged to carry the photocomposing apparatus.

A better understanding of the present invention may be had when the following detailed description is read in connection with accompanying drawing, in which the single figure is a pictorial illustration of a support structure for a photocomposing machine embodying the present invention.

Referring to the single figure in more detail, there is shown a photocomposing system comprising a cathode ray tube 1, an optical lens unit 2 and a recording camera device 3. The tube 1, or CRT, has associated with it suitable focussing and deflection means 4 for selectively positioning an image on the face of the CRT 1. In other words, the CRT 1 is arranged to produce characters on its face by means of input deflection control signals applied to the deflection means 4. The characters are advantageously formed by a succession of dots positioned by these control signals with the characters being arranged in rows to produce the text of the document desired to be printed. Thus, the dots and the ensuing characters must be precisely positioned within the framework of the desired textual layout in order to produce a recording by the camera 3 which is acceptable for supsequent use in the printing industry.

In order to provide a photocomposing apparatus suitable for commercial success, there is, also, necessary to consider the economic factors, such as selling price, which are to a large extent dependent on the complexity of the overall equipment. Accordingly, the elimination of environment controlled rooms or chambers is effective to produce an apparatus having a greater probability of commercial success as a result of a favorable selling price for the photocomposing apparatus. In the present invention, the need for such elaborate auxiliary equipment is eliminated with a consequent enhancement of mechanical dependability and of increased portability. Thus, by providing a photocomposing apparatus having a maximum composing precision within a machine having a minimum structural complexity the aforesaid prior art problems are avoided.

The present invention provides the necessary structural characteristics for a photocomposing machine by having the CRT 1, lens 2 and camera 3 mounted on a rigid framework comprising three support bars 5 arranged in a longitudinally triangulated relationship. This relationship is preferably of an equi-angular triangulated form. The bars 5 may advantageously be hollow tubes of a suitable low thermal coefficient of expansion material, e.g., stainless steel, to minimize temperature effects and in order to lighten the overall structure. The CRT 1, lens 2 and camera 3 may be slidably mounted on the bars 5 to provide for focussing adjustments, etc. This arrangement mechanically decouples the optical system from the support structure to maintain a fixed magnification.

The bars 5, in turn are mounted on shock absorbing mounts 6 suitably distributed along a lower pair of the bars 5. The mounts 6, in turn, are attached to a rigid support frame arranged as a hollow rectangular truss 7 having a so-called "dead" resonance, i.e., below one cycle per second and supporting all the shock mounts 6. The lower pair of the bars 5 are slidably passed through eyes 8 on the shock mounts 6 to provide for any thermal longitudinal expansion of the bars 5. The eyes 8 are interconnected in transversely aligned pairs across the frame 7 by cross-members 9 to provide a unified structure carrying the bars 5.

A light-tight enclosure 10, having a hinged cover 11 arranged to provide access to the lens assembly 2, is operative to exclude undesired ambient light from the camera 3 and the recording medium therein. The camera 3 may be mounted by any suitable means to form a light-tight seal with an endplate 12 mounted on the three bars 5. The end-plate 12 is provided with an aperture 14 to expose the recording medium within the camera 3 to the image projected by lens 2 from the face of the CRT 1. The framework 7 may be further mounted on additional shock absorbing mounts 15 located between the framework 7 and an ultimate machine base 16. The mounts 8, and 15 may be arranged to dampen different vibration frequency ranges to even more effectively isolate the photocomposing mounting structure.

Accordingly, it may be seen that there has been provided, in accordance with the present invention, a photocomposing machine support structure having environmental isolating characteristics with precise positioning of the photocomposer operative elements.

What is claimed is:

1. A photocomposing machine support structure for supporting a plurality of operative components of said machine comprising, a group of three substantially horizontal and substantially parallel support bars spaced from each other in a manner to form a triangular profile and to define a delimited volume, means for slidably mounting said operative components on said support bars within said delimited volume, said slidable mounting including a plurality of support eyelets attached to said operative components for slidably receiving said support bars, and shock-absorbing mountings arranged to support at least the lower two of said bars, with said mountings including support eyes for slidably receiving two of said bars.

2. A photocomposing machine support structure as set forth in claim 1 wherein said support bars are arranged in an equi-angular relationship.

References Cited

UNITED STATES PATENTS

| | | | |
|---|---|---|---|
| 1,034,968 | 8/1912 | Broom | 88—24 |
| 2,567,293 | 9/1951 | Maxwell | 88—24 |
| 2,727,431 | 12/1955 | Blatherwick | 88—24 |

JOHN M. HORAN, Primary Examiner